(12) United States Patent
Nield

(10) Patent No.: US 6,702,942 B1
(45) Date of Patent: Mar. 9, 2004

(54) WATER CONSERVATION DEVICE, KIT AND METHOD OF USING

(76) Inventor: Richard E. Nield, Rte. 1 Box 8A, Wiley Ford, WV (US) 26767

( * ) Notice: Subject to any disclaimer, the term of this patent is extended or adjusted under 35 U.S.C. 154(b) by 11 days.

(21) Appl. No.: 10/317,754

(22) Filed: Dec. 11, 2002

(51) Int. Cl.[7] ................................................. C02F 1/00
(52) U.S. Cl. .................. 210/416.1; 210/418; 210/532.1
(58) Field of Search ................................. 210/167, 170, 210/194, 195.1, 196, 416.1, 418, 532.1

(56) References Cited

U.S. PATENT DOCUMENTS

| | | | | |
|---|---|---|---|---|
| 3,815,159 A | * | 6/1974 | Delaney et al. | 4/317 |
| 5,106,493 A | * | 4/1992 | McIntosh | 210/100 |
| 5,192,426 A | * | 3/1993 | DeCoster et al. | 210/117 |
| 5,288,412 A | * | 2/1994 | Voorhees et al. | 210/739 |
| 5,454,936 A | * | 10/1995 | Ask et al. | 210/86 |
| 5,498,330 A | * | 3/1996 | Delle Cave | 210/103 |
| 5,573,677 A | * | 11/1996 | Dembrosky | 210/764 |
| 5,787,537 A | * | 8/1998 | Mannillo | 8/158 |
| 5,868,937 A | * | 2/1999 | Back et al. | 210/651 |
| 6,143,185 A | * | 11/2000 | Tracy et al. | 210/744 |
| 6,299,775 B1 | * | 10/2001 | Elston | 210/605 |
| 6,355,160 B1 | * | 3/2002 | Wiseman et al. | 210/90 |
| 6,517,711 B1 | * | 2/2003 | Rummler et al. | 210/185 |

* cited by examiner

Primary Examiner—Fred G. Prince

(57) ABSTRACT

A water conservation device, kit and method of using is disclosed for use in capturing gray water generated from a drain of a fresh water utility apparatus operationally interconnected connected to a fresh water source and for recycling the captured gray water to a gray water utility apparatus. The device comprises the operationally connected elements of a T-junction pipe, a first shutoff valve, a filter entrance pipe, a water filter apparatus, a filter exit pipe, a storage tank, an overflow pipe, an air vent stack, a second shutoff valve, a bypass pipe, a fresh water feed pipe, a third shutoff valve, a fresh water drain pipe, a fourth shutoff valve, a grey water drain pipe, a water pump, and a primary grey water feed pipe. The kit comprises the unattached elements of a T-junction pipe, a first shutoff valve, a filter entrance pipe, a water filter apparatus, a filter exit pipe, a storage tank, an overflow pipe, an air vent stack, a second shutoff valve, a bypass pipe, a fresh water feed pipe, a third shutoff valve, a fresh water drain pipe, a fourth shutoff valve, a grey water drain pipe, a water pump, and a primary grey water feed pipe and a float valve. The method comprises the steps of adjoining, affixing, associating, attaching, binding, bonding, cohering, combining, conjoining, connecting, consolidating, joining, linking, mating, obtaining, placing, putting, tying, and uniting.

19 Claims, 2 Drawing Sheets

WATER CONSERVATION DEVICE, KIT AND METHOD OF USING

FIELD OF THE INVENTION

The present invention relates conservation, more particularly to a water conservation device, kit and associated method for use in capturing gray water generated from a drain of a fresh water utility apparatus operationally connected to a fresh water source and in recycling the captured gray water to a gray water utility apparatus.

DESCRIPTION OF THE PRIOR ART

One of the most essential ingredients for life is wholesome, palatable drinking water. Throughout the history of mankind, wars have been fought over the possession and ownership of bodies of potable water. Man may exit for weeks upon nothing but water and its essential value has always been recognized.

In modern times, through industrialization, urbanization and population growth, vast sources of clean water have been eliminated or so contaminated as to be rendered unfit for human consumption. The invention involves a system whereby available water supplies are more judiciously utilized by improved and more effective distribution, thus saving a substantial fraction of water without harming the consumer or the community.

In household sinks and showers of conventional systems currently in use, the water is soiled by soap and material washed from a person's body, and discharged to the sewer drain. With laundry washing machines the sewer discharged water is soiled by the detergent and the dirt from the laundry. With rain water the dtritus is largely leaves, twigs and air borne soot. Such water is commonly referred to as "gray matter."

In water closets of toilets their proper functioning is predicated upon the provision of a proper liquid volumetric vehicles, usually several gallons of water are required to carry off the waste contained therein. It is not essential that the water used in these devices be potable in the strict sense. The waste entailed in conventional systems is not only of natural resources but also is an unnecessary drain on the user.

A wide variety of water conservation devices is currently available on the commercial market and an even larger number of these types of devices are known in the art of water conservation devices, for example, the water conservation system disclosed by Call in U.S. Pat. No. 3,112,497; the recirculating sewerage system disclosed by Davis in U.S. Pat. No. 4,017,395; the water recirculation system disclosed by Toms in U.S. Pat. No. 4,115,879; the dual outlet bathtub drain valve for water conservation system disclosed by Coe, III in U.S. Pat. No. 5,210,886; the shower water recycling apparatus disclosed by Sanchez in U.S. Pat. No. 5,277,218; and the wastewater treatment tank disclosed by Pomier in U.S. Pat. No. 445,477.

While all of the above-described devices fulfill their respective, particular objectives and requirements, the aforementioned patents do not describe a water conservation device having operationally interconnected elements of a T-junction pipe, a first shutoff valve, a filter entrance pipe, a water filter apparatus, a filter exit pipe, a storage tank, an overflow pipe, an air vent stack, a second shutoff valve, a bypass pipe, a fresh water feed pipe, a third shutoff valve, a fresh water drain pipe, a fourth shutoff valve, a grey water drain pipe, a water pump, and a primary grey water feed pipe. This combination of elements would specifically match the user's particular individual needs of making it possible to capture gray water generated from a drain of a fresh water utility apparatus operationally connected to a fresh water source and to recycle the captured gray water to a gray water utility apparatus. The above-described patents make no provision for a water conservation device having operationally interconnected elements of a T-junction pipe, a first shutoff valve, a filter entrance pipe, a water filter apparatus, a filter exit pipe, a storage tank, an overflow pipe, an air vent stack, a second shutoff valve, a bypass pipe, a fresh water feed pipe, a third shutoff valve, a fresh water drain pipe, a fourth shutoff valve, a grey water drain pipe, a water pump, and a primary grey water feed pipe.

Therefore, a need exists for a new and improved water conservation device having operationally interconnected elements of a T-junction pipe, a first shutoff valve, a filter entrance pipe, a water filter apparatus, a filter exit pipe, a storage tank, an overflow pipe, an air vent stack, a second shutoff valve, a bypass pipe, a fresh water feed pipe, a third shutoff valve, a fresh water drain pipe, a fourth shutoff valve, a grey water drain pipe, a water pump, and a primary grey water feed pipe. In this respect, the water conservation device according to the present invention substantially departs from the conventional concepts and designs of the prior art, and in doing so provides an apparatus primarily developed for the purpose of providing a means for capturing gray water generated from a drain of a fresh water utility apparatus operationally connected to a fresh water source and a means for recycling the captured gray water to a gray water utility apparatus

SUMMARY OF THE INVENTION

The present device, kit and method of using, according to the principles of the present invention, overcomes the shortcomings of the prior art by providing a water conservation device, kit and method of using is disclosed in which the device comprises the operationally interconnected connected elements of a T-junction pipe, a first shutoff valve, a filter entrance pipe, a water filter apparatus, a filter exit pipe, a storage tank, an overflow pipe, an air vent stack, a second shutoff valve, a bypass pipe, a fresh water feed pipe, a third shutoff valve, a fresh water drain pipe, a fourth shutoff valve, a grey water drain pipe, a water pump, and a primary grey water feed pipe. The kit comprises the unattached elements of a T-junction pipe, a first shutoff valve, a filter entrance pipe, a water filter apparatus, a filter exit pipe, a storage tank, an overflow pipe, an air vent stack, a second shutoff valve, a bypass pipe, a fresh water feed pipe, a third shutoff valve, a fresh water drain pipe, a fourth shutoff valve, a grey water drain pipe, a water pump, and a primary grey water feed pipe and a float valve. The method comprises the steps of adjoining, affixing, associating, attaching, binding, bonding, cohering, combining, conjoining, connecting, consolidating, joining, linking, mating, obtaining, placing, putting, tying, and uniting.

In view of the foregoing disadvantages inherent in the known type water conservation devices now present in the prior art, the present invention provides an improved water conservation device, which will be described subsequently in great detail, is to provide a new and improved water conservation device which is not anticipated, rendered obvious, suggested, or even implied by the prior art, either alone or in any combination thereof.

To attain this, the present invention essentially comprises a the operationally interconnected connected elements of a T-junction pipe, a first shutoff valve, a filter entrance pipe, a water filter apparatus, a filter exit pipe, a storage tank, an overflow pipe, an air vent stack, a second shutoff valve, a bypass pipe, a fresh water feed pipe, a third shutoff valve, a fresh water drain pipe, a fourth shutoff valve, a grey water drain pipe, a water pump, and a primary grey water feed pipe. The kit comprises the unattached elements of a T-junction pipe, a first shutoff valve, a filter entrance pipe, a water filter apparatus, a filter exit pipe, a storage tank, an overflow pipe, an air vent stack, a second shutoff valve, a bypass pipe, a fresh water feed pipe, a third shutoff valve, a fresh water drain pipe, a fourth shutoff valve, a grey water drain pipe, a water pump, and a primary grey water feed pipe and a float valve. The method comprises the steps of adjoining, affixing, associating, attaching, binding, bonding, cohering, combining, conjoining, connecting, consolidating, joining, linking, mating, obtaining, placing, putting, tying, and uniting.

There has thus been outlined, rather broadly, the more important features of the invention in order that the detailed description thereof that follows may be better understood, and in order that the present contribution of the art may be better appreciated.

The invention may also include float valve. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water conservation device that has all the advantages of the prior art water conservation device and none of the disadvantages.

It is another object of the present invention to provide a new and improved water conservation device that may be easily and efficiently manufactured and marketed.

An even further object of the present invention is to provide a new and improved water conservation device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new water conservation device that provides in the apparatuses and methods of the prior art some of the advantages thereof, while simultaneously overcoming some of the disadvantages normally associated therewith.

Even still another object of the present invention is to provide a water conservation device having operationally interconnected elements of a T-junction pipe, a first shutoff valve, a filter entrance pipe, a water filter apparatus, a filter exit pipe, a storage tank, an overflow pipe, an air vent stack, a second shutoff valve, a bypass pipe, a fresh water feed pipe, a third shutoff valve, a fresh water drain pipe, a fourth shutoff valve, a grey water drain pipe, a water pump, and a primary grey water feed pipe. This combination of elements makes it possible to capture gray water generated from a drain of a fresh water utility apparatus operationally connected to a fresh water source and to recycle the captured gray water to a gray water utility apparatus.

Still another object of the present invention is to provide a kit comprising the unconnected elements of the device.

Lastly, it is an object of the present invention to provide a new and improved method of using comprising the steps of adjoining, affixing, associating, attaching, binding, bonding, cohering, combining, conjoining, connecting, consolidating, joining, linking, mating, obtaining, placing, putting, tying, and uniting.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
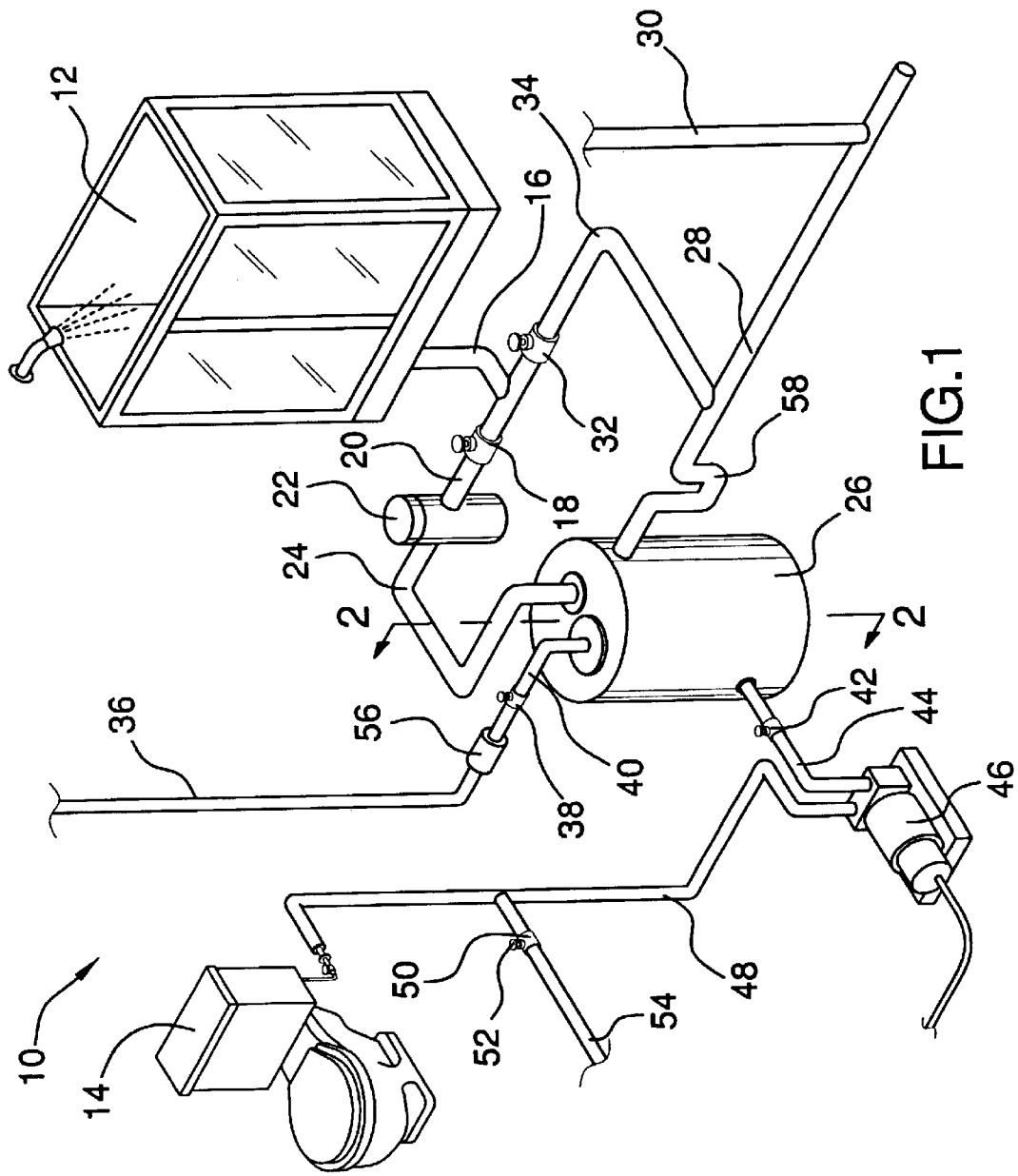
FIG. 1 is a perspective view of an preferred embodiment of the water conservation device constructed in accordance with the principles of the present invention.
Figure 2:
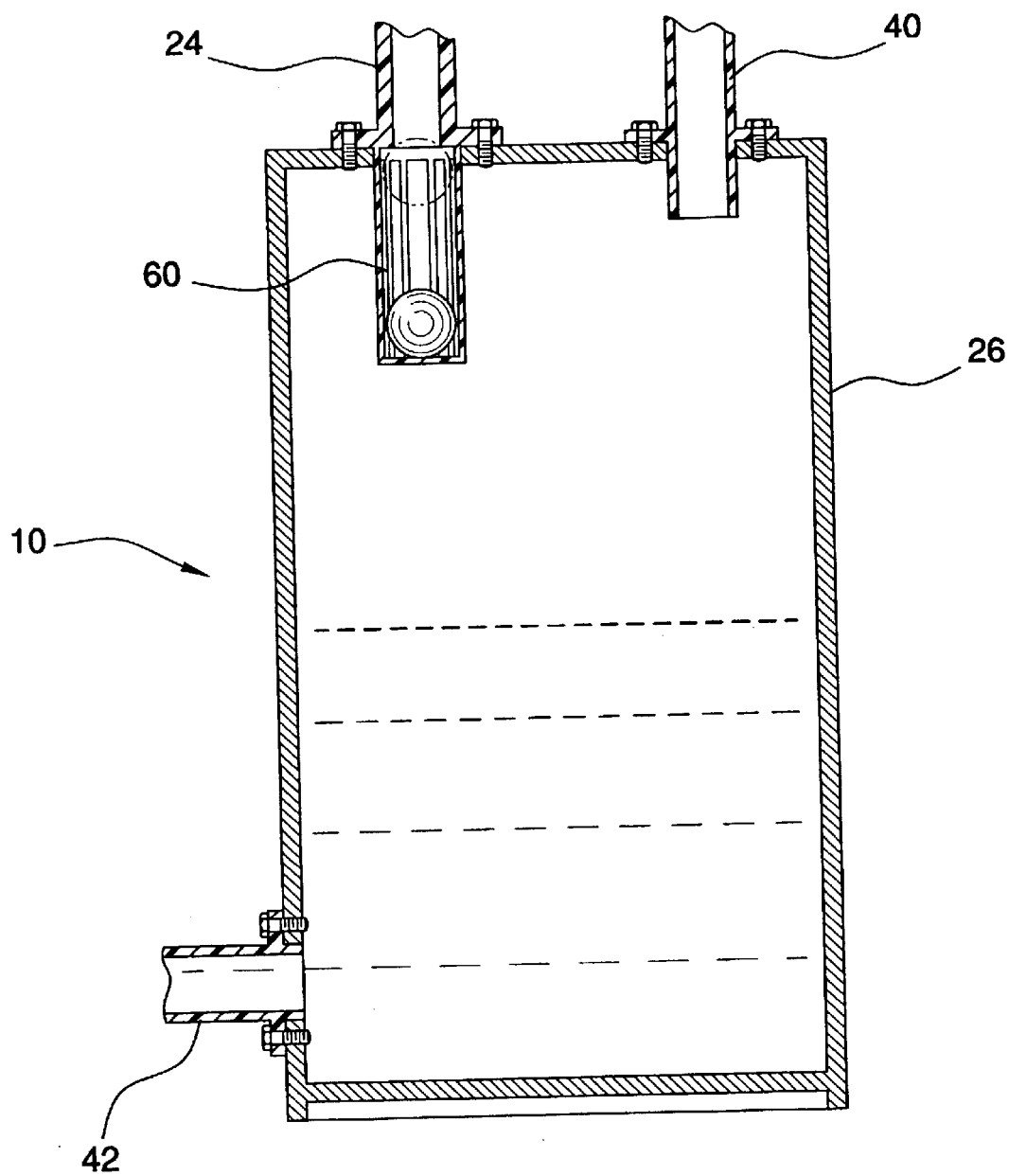
FIG. 2 is a cross sectional view of a preferred embodiment of the water conservation device of the present invention.

Referring now to the drawings, and in particular FIGS. 1 to 2 thereof, one preferred embodiment of the present invention is shown and generally designated by the reference numeral 10. One preferred embodiment of a water conservation device 10 for capturing gray water generated from a drain of a fresh water utility apparatus 12 operationally connected to a fresh water source and for recycling the captured gray water to a gray water utility apparatus 14. The device 10 comprising: a T-junction pipe 16, a first shutoff valve 18, a filter entrance pipe 20, a water filter apparatus 22, a filter exit pipe 24, a storage tank 26, an overflow pipe 28, an air vent stack 30, a second shutoff valve 32, a bypass pipe 34, a fresh water feed pipe 36, a third shutoff valve 38, a fresh water drain pipe 40, a fourth shutoff valve 42, a grey water drain pipe 44, a water pump 46, and a primary grey water feed pipe 48. The T-junction pipe 16 has an inlet and a first and second outlets, the inlet of the T-junction pipe 16 is operationally attached to the drain of the fresh water utility apparatus 12. The first shutoff valve 18 is operationally attached to the first outlet of the T-junction pipe 16. The filter entrance pipe 20 is operationally attached to the first shutoff valve 18. The water filter apparatus 22 is operationally attached to the filter entrance pipe 20. The filter exit pipe 24 is operationally attached to the water filter apparatus 22. The storage tank 26 is operationally attached to the filter exit pipe 24. The overflow pipe 28 is operationally attached to the storage tank 26. The air vent stack 30 is operationally attached to the overflow pipe 28. The second shutoff valve 32 is operationally attached to the second outlet of the T-junction pipe 16. The bypass pipe 34 is operationally attached to the second shutoff valve 32 and is operationally attached to the overflow pipe 28. The fresh water feed pipe 36 is operationally attached to the fresh water source. The third shutoff valve 38 is operationally attached to the fresh water feed pipe 36. The fresh water drainpipe 40 is operationally attached to the third shutoff valve 38 and is operationally attached to the storage tank 26. The fourth shutoff valve 42 is operationally attached to the storage tank 26. The grey water drainpipe 44 is operationally attached to the fourth shutoff valve 42. The water pump 46 having a water inlet and a water outlet, the water inlet of the water pump 46 is operationally attached to the grey water drain pipe 44. The primary grey water feed pipe 48 is operationally attached to the water outlet of the water pump 46 and is operationally attached to the gray water utility apparatus 14.

An optional split line pipe 50, a fifth shutoff valve 52, and a secondary gray water feed pipe 54 may be added to the device 10. The split line pipe 50 is operationally attached to the primary grey water feed pipe 48. The fifth shutoff valve 52 is operationally attached to the grey water feed pipe. The secondary gray water feed pipe 54 is operationally attached to the fifth shutoff valve 52 and is operationally attached to a second gray water utility apparatus 14.

An optional check valve 56 operationally attached within the fresh water feed pipe 36 may be added to the device 10.

An optional U-shaped P-trap 58 operationally attached to the overflow pipe 28 may be added to the device 10.

An optional float valve 60 operationally attached between the filter exit pipe 24 and the storage tank 26 may be added to the device 10.

The device 10 may be plumbed to receive grey water from any number of fresh water utility apparatus 12. The fresh water utility apparatus 12 is selected from the group consisting of a shower, a bathtub, a kitchen sink, a bathroom sink, a dishwasher apparatus, a clothes washer apparatus, a swimming pool, a jacuzzi, and a hot tub.

The device 10 may be plumbed to deliver the received gray water to any number of gray water utility apparatus 14. The gray water utility apparatus 14 is selected from the group consisting of a toilet, a urinal, an outdoor sprinkler system, and an irrigation system.

One preferred embodiment of a kit for assembling a water conservation device 10 for use in capturing gray water generated from a drain of a fresh water utility apparatus 12 operationally connected to a fresh water source and for recycling the captured gray water to a gray water utility apparatus 14. The kit comprises: a T-junction pipe, a first shutoff valve 18, a filter entrance pipe 20, a water filter apparatus 22, a filter exit pipe 24, a storage tank 26, an overflow pipe 28, an air vent stack 30, a second shutoff valve 32, a bypass pipe 34, a fresh water feed pipe 36, a third shutoff valve 38, a fresh water drain pipe 40, a fourth shutoff valve 42, grey water drain pipe 44, water pump 46, primary grey water feed pipe 48, and a float valve 60. The T-junction pipe 16 has an inlet and first and second outlets, the inlet of the T-junction pipe 16 operationally attachable to the drain of the fresh water utility apparatus 12. The first shutoff valve 18 is operationally attachable to the first outlet of the T-junction pipe 16. The filter entrance pipe 20 is operationally attachable to the first shutoff valve 18. The water filter apparatus 22 is operationally attachable to the filter entrance pipe 20. The filter exit pipe 24 is operationally attachable to the water filter apparatus 22. The storage tank 26 is operationally attachable to the filter exit pipe 24. Then overflow pipe 28 is operationally attachable to the storage tank 26. Then air vent stack 30 is operationally attachable to the overflow pipe 28. The second shutoff valve 32 is operationally attachable to the second outlet of the T-junction pipe 16. The bypass pipe 34 is operationally attachable to the second shutoff valve 32 and is operationally attachable to the overflow pipe 28. The fresh water feed pipe 36 is operationally attachable to the fresh water source. The third shutoff valve 38 is operationally attachable to the fresh water feed pipe 36. The fresh water drainpipe 40 is operationally attachable to the third shutoff valve 38 and is operationally attachable to the storage tank 26. The fourth shutoff valve 42 is operationally attachable to the storage tank 26. The grey water drainpipe 44 is operationally attachable to the fourth shutoff valve 42. The water pump 46 having a water inlet and a water outlet, the water inlet of the water pump 46 is operationally attachable to the grey water drainpipe 44. The primary grey water feed pipe 48 is operationally attachable to the water outlet of the water pump 46 and is operationally attachable to the gray water utility apparatus 14. The float valve 60 is operationally attachable between the filter exit pipe 24 and the storage tank 26.

One preferred embodiment of a method of using a kit for assembling a water conservation device 10 for use in capturing gray water generated from a drain of a fresh water utility apparatus 12 operationally connected to a fresh water source and for recycling the captured gray water to a gray water utility apparatus 14. the method comprising the steps of adjoining, affixing, associating, attaching, binding, bonding, cohering, combining, conjoining, connecting, consolidating, joining, linking, mating, obtaining, placing, putting, tying, and uniting. The obtaining step comprises obtaining the kit comprising: a T-junction pipe 16 having an inlet and a first and second outlets, the inlet of the T-junction pipe 16 operationally attachable to the drain of the fresh water utility apparatus 12; a first shutoff valve 18 operationally attachable to the first outlet of the T-junction pipe 16; a filter entrance pipe 20 operationally attachable to the first shutoff valve 18; a water filter apparatus 22 operationally attachable to the filter entrance pipe 20; a filter exit pipe 24 operationally attachable to the water filter apparatus 22; a storage tank 26 operationally attachable to the filter exit pipe 24; an overflow pipe 28 operationally attachable to the storage tank 26; an air vent stack 30 operationally attachable to the overflow pipe 28; a second shutoff valve 32 operationally attachable to the second outlet of the T-junction pipe 16; a bypass pipe 34 operationally attachable to the second shutoff valve 32 and operationally attachable to the overflow pipe 28; a fresh water feed pipe 36 attachable to the fresh water source; a third shutoff valve 38 operationally attachable to the fresh water feed pipe 36; a fresh water drain pipe 40 operationally attachable to the third shutoff valve 38 and operationally attachable to the storage tank 26; a fourth shutoff valve 42 operationally attachable to the storage tank 26; a grey water drain pipe 44 operationally attachable to the fourth shutoff valve 42; a water pump 46 having a water inlet and a water outlet, the water inlet of the water pump 46 operationally attachable to the grey water drain pipe 44; a primary grey water feed pipe 48 operationally attachable to the water outlet of the water pump 46 and operationally attachable to the gray water utility apparatus 14; and a float valve 60 operationally attachable between the filter exit pipe 24 and the storage tank 26. The adjoining step comprises adjoining operationally the inlet of the T-junction pipe 16 to the drain of the fresh water utility apparatus 12. The affixing step comprises affixing operationally together the first shutoff valve 18 to the first outlet of the T-junction pipe 16. The binding step comprises binding operationally together the filter entrance pipe 20 to the first shutoff valve 18. The bonding step comprises bonding operationally together the water filter apparatus 22 to the filter entrance pipe 20. The mating step comprises mating operationally together the filter exit pipe 24 to the water filter apparatus 22. The cohering step comprises cohering operationally together the storage tank 26 to the filter exit pipe 24. The combining step comprises combining operationally together the overflow pipe 28 to the storage tank 26. The conjoining step comprises conjoining operationally together the air vent stack 30 to the overflow pipe 28. The joining step comprises joining operationally together the second shutoff valve 32 to the second outlet of the T-junction pipe 16. The linking step comprises linking operationally together the bypass pipe 34 to the second shutoff valve 32 and operationally together attachable to the overflow pipe 28. The tying step comprises tying operationally together the fresh water feed pipe 36 to the fresh water source. The uniting step comprises uniting operationally together the third shutoff valve 38 to the fresh water feed pipe 36. The putting step comprises putting operationally together the fresh water drain pipe 40 to the third shutoff valve 38 and operationally together attachable to the storage tank 26. The placing step comprises placing operationally together the fourth shutoff valve 42 to the attached to the storage tank 26. The connecting step comprises connecting operationally together the grey water drain pipe 44 to the fourth shutoff valve 42. The associating step comprises associating operationally together the water inlet of the water pump 46 to the grey water drain pipe 44. The consolidating step comprises consolidating operationally together the primary grey water feed pipe 48 to the water outlet of the water pump 46 and to the gray water utility apparatus 14. The attaching step comprises attaching operationally together the float valve 60 between the filter exit pipe 24 and the storage tank 26.

As to the manner of usage and operation of the present invention, the same should be apparent from the above description. Accordingly, no further discussion relating to the manner of usage and operation will be provided.

While a preferred embodiment of the water conservation device has been described in detail, it should be apparent that modifications and variations thereto are possible, all of which fall within the true spirit and scope of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes or variations, thereof, or the them "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications that fall within its spirit and scope. The invention also includes all of the steps, features, compositions and compounds referred to or indicated in this specification, individually or collectively, and any and all combination any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water conservation device for capturing gray water generated from a drain of a fresh water utility apparatus operationally connected to a fresh water source and for recycling the captured gray water to a gray water utility apparatus, said device comprising:

a T-junction pipe having an inlet and a first and second outlets, said inlet of said T-junction pipe operationally attached to the drain of the fresh water utility apparatus;

a first shutoff valve operationally attached to said first outlet of said T-junction pipe;

a filter entrance pipe operationally attached to said first shutoff valve;

a water filter apparatus operationally attached to said filter entrance pipe;

a filter exit pipe operationally attached to said water filter apparatus;

a storage tank operationally attached to said filter exit pipe;

an overflow pipe operationally attached to said storage tank;

an air vent stack operationally attached to said overflow pipe;

a second shutoff valve operationally attached to said second outlet of said T-junction pipe;

a bypass pipe operationally attached to said second shutoff valve and operationally attached to said overflow pipe;

a fresh water feed pipe operationally attached to the fresh water source;

a third shutoff valve operationally attached to said fresh water feed pipe;

a fresh water drain pipe operationally attached to said third shutoff valve and operationally attached to said storage tank;

a fourth shutoff valve operationally attached to said storage tank;

a grey water drain pipe operationally attached to said fourth shutoff valve;

a water pump having a water inlet and a water outlet, said water inlet of said water pump operationally attached to said grey water drain pipe; and a primary grey water feed pipe operationally attached to said water outlet of said water pump and operationally attached to the gray water utility apparatus.

2. The device of claim 1 further comprising:

a split line pipe operationally attached to said primary grey water feed pipe;

a fifth shutoff valve operationally attached to said grey water feed pipe; and a secondary gray water feed pipe operationally attached to said fifth shutoff valve and operationally attached to a second gray water utility apparatus.

3. The device of claim 1 further comprising a check valve operationally attached within the fresh water feed pipe.

4. The device of claim 1 further comprising a U-shaped P-trap operationally attached to said overflow pipe.

5. The device of claim 1 further comprising a float valve operationally attached between said filter exit pipe and said storage tank.

6. The device of claim 1 wherein the fresh water utility apparatus comprises a shower.

7. The device of claim 1 wherein the fresh water utility apparatus comprises a bath tub.

8. The device of claim 1 wherein the fresh water utility apparatus comprises a kitchen sink.

9. The device of claim 1 wherein the fresh water utility apparatus comprises a bathroom sink.

10. The device of claim 1 wherein the fresh water utility apparatus comprises a dishwasher apparatus.

11. The device of claim 1 wherein the fresh water utility apparatus comprises a clothes washer apparatus.

12. The device of claim 1 wherein the fresh water utility apparatus comprises a swimming pool.

13. The device of claim 1 wherein the fresh water utility apparatus comprises a hot tub.

14. The device of claim 1 wherein the gray water utility apparatus comprises a toilet.

15. The device of claim 1 wherein the gray water utility apparatus comprises a urinal.

16. The device of claim 1 wherein the gray water utility apparatus comprises an outdoor sprinkler system.

17. The device of claim 1 wherein the gray water utility apparatus comprises an irrigation system.

18. A kit for assembling a water conservation device for use in capturing gray water generated from a drain of a fresh water utility apparatus operationally connected to a fresh water source and for recycling the captured gray water to a gray water utility apparatus, said kit comprising:

a T-junction pipe having an inlet and a first and second outlets, said inlet of said T-junction pipe operationally attachable to the drain of the fresh water utility apparatus;

a first shutoff valve operationally attachable to said first outlet of said T-junction pipe;

a filter entrance pipe operationally attachable to said first shutoff valve;

a water filter apparatus operationally attachable to said filter entrance pipe;

a filter exit pipe operationally attachable to said water filter apparatus;

a storage tank operationally attachable to said filter exit pipe;

an overflow pipe operationally attachable to said storage tank;

an air vent stack operationally attachable to said overflow pipe;

a second shutoff valve operationally attachable to said second outlet of said T-junction pipe;

a bypass pipe operationally attachable to said second shutoff valve and operationally attachable to said overflow pipe;

a fresh water feed pipe operationally attachable to the fresh water source;

a third shutoff valve operationally attachable to said fresh water feed pipe;

a fresh water drain pipe operationally attachable to said third shutoff valve and operationally attachable to said storage tank;

a fourth shutoff valve operationally attachable to said storage tank;

a grey water drain pipe operationally attachable to said fourth shutoff valve;

a water pump having a water inlet and a water outlet, said water inlet of said water pump operationally attachable to said grey water drain pipe;

a primary grey water feed pipe operationally attachable to said water outlet of said water pump and operationally attachable to the gray water utility apparatus; and a float valve operationally attachable between said filter exit pipe and said storage tank.

19. A method of using a kit for assembling a water conservation device for use in capturing gray water generated from a drain of a fresh water utility apparatus operationally connected to a fresh water source and for recycling the captured gray water to a gray water utility apparatus, the method comprising:

obtaining the kit comprising:

a T-junction pipe having an inlet and a first and second outlets, the inlet of the T-junction pipe operationally attachable to the drain of the fresh water utility apparatus;

a first shutoff valve operationally attachable to the first outlet of the T-junction pipe;

a filter entrance pipe operationally attachable to the first shutoff valve;

a water filter apparatus operationally attachable to the filter entrance pipe;

a filter exit pipe operationally attachable to the water filter apparatus;

a storage tank operationally attachable to the filter exit pipe;

an overflow pipe operationally attachable to the storage tank;

an air vent stack operationally attachable to the overflow pipe;

a second shutoff valve operationally attachable to the second outlet of the T-junction pipe;

a bypass pipe operationally attachable to the second shutoff valve and operationally attachable to the overflow pipe;

a fresh water feed pipe attachable to the fresh water source;

a third shutoff valve operationally attachable to the fresh water feed pipe;

a fresh water drain pipe operationally attachable to the third shutoff valve and operationally attachable to the storage tank;

a fourth shutoff valve operationally attachable to the fresh water drain pipe;

a grey water drain pipe operationally attachable to the fourth shutoff valve;

a water pump having a water inlet and a water outlet, the water inlet of the water pump operationally attachable to the grey water drain pipe;

a primary grey water feed pipe operationally attachable to the water outlet of the water pump and operationally attachable to the gray water utility apparatus; and a float valve operationally attachable between the filter exit pipe and the storage tank;

adjoining operationally the inlet of the T-junction pipe to the drain of the fresh water utility apparatus;

affixing operationally together the first shutoff valve to the first outlet of the T-junction pipe;

binding operationally together the filter entrance pipe to the first shutoff valve;

bonding operationally together the water filter apparatus to the filter entrance pipe;

mating operationally together the filter exit pipe to the water filter apparatus;

cohering operationally together the storage tank to the filter exit pipe;

combining operationally together the overflow pipe to the storage tank;

conjoining operationally together the air vent stack to the overflow pipe;

joining operationally together the second shutoff valve to the second outlet of the T-junction pipe;

linking operationally together the bypass pipe to the second shutoff valve and operationally together attachable to the overflow pipe;

tying operationally together the fresh water feed pipe to the fresh water source;

uniting operationally together the third shutoff valve to the fresh water feed pipe;

putting operationally together the fresh water drain pipe to the third shutoff valve and operationally together attachable to the storage tank;

placing operationally together the fourth shutoff valve to the storage tank;

connecting operationally together the grey water drain pipe to the fourth shutoff valve;

associating operationally together the water inlet of the water pump to the grey water drain pipe;

consolidating operationally together the primary grey water feed pipe to the water outlet of the water pump and to the gray water utility apparatus; and attaching operationally together the float valve between the filter exit pipe and the storage tank.

\* \* \* \* \*